(12) United States Patent
Majoor

(10) Patent No.: US 6,993,514 B2
(45) Date of Patent: Jan. 31, 2006

(54) MECHANISM AND METHOD FOR CONTINUOUS OPERATION OF A RULE SERVER

(75) Inventor: Johannes W. F. Majoor, San Francisco, CA (US)

(73) Assignee: Fair Isaac Corporation, San Diego, CA (US)

( * ) Notice: Subject to any disclaimer, the term of this patent is extended or adjusted under 35 U.S.C. 154(b) by 676 days.

(21) Appl. No.: 09/948,991

(22) Filed: Sep. 7, 2001

(65) Prior Publication Data

US 2002/0049691 A1 Apr. 25, 2002

Related U.S. Application Data

(60) Provisional application No. 60/231,161, filed on Sep. 7, 2000.

(51) Int. Cl.
*G06N 5/02* (2006.01)

(52) U.S. Cl. .............................. 706/47; 706/14; 706/12

(58) Field of Classification Search ................. 706/47, 706/14, 12, 649, 634; 84/649, 634
See application file for complete search history.

(56) References Cited

U.S. PATENT DOCUMENTS

| 5,736,666 | A | * | 4/1998 | Goodman et al. ............ 84/669 |
| 5,883,326 | A | * | 3/1999 | Goodman et al. ............ 84/649 |
| 6,229,082 | B1 | * | 5/2001 | Masias ........................ 84/645 |
| 6,245,984 | B1 | * | 6/2001 | Aoki et al. .................... 84/611 |

* cited by examiner

*Primary Examiner*—Anthony Knight
*Assistant Examiner*—Joseph P. Hirl
(74) *Attorney, Agent, or Firm*—Michael A. Glenn; Robert Sachs; Glenn Patent Group

(57) ABSTRACT

An improved method and mechanism is disclosed for updating rules used by a rule server. An embodiment is directed to a method and mechanism for connecting one or more rule service agents to a rule server, in which rules may be changed and put into operation without taking the rule server offline.

14 Claims, 9 Drawing Sheets

MECHANISM AND METHOD FOR CONTINUOUS OPERATION OF A RULE SERVER

RELATED APPLICATION DATA

This application claims priority to U.S. provisional application Ser. No. 60/231,161 filed on Sep. 7, 2000, which is incorporated herein by reference in its entirety.

BACKGROUND AND SUMMARY

The present invention relates generally to computer systems that utilize rules-based mechanisms to facilitate or implement an application or business process. A type of system that often uses a rules-based approach is an expert system or knowledge-based system, which attempts to mimic the thought process that an expert would utilize to address tasks in a particular field. Computer systems that employ rules-based mechanisms, e.g. experts systems, are employed in a wide variety of settings, such as computer systems that bank loan officers use for guidance in approving and rejecting loan applications. Other examples of disciplines in which rules-based based systems are used include automobile repair, medical diagnosis, oil exploration, financial planning, chemical analysis, surgery, weather prediction, computer repair, computer system configuration, operation of nuclear plants, interpreting government regulations, tax preparation, as well as many others.

A typical rules-based approach employs one or more sets of rules ("rulesets") that define actions or results that occur upon specified input values or parameters. A rule server is a computing device that performs the functionality of applying a set of rules to a given set of input values or parameters. An exemplary rules-based product embodying this approach is the Blaze Advisor™ product available from HNC Software, Inc. of San Diego, Calif.

One advantage of the rules-based approach is that additions, extensions, and/or modifications to an application/business process can be implemented by changing rule entries in corresponding ruleset(s) rather than undertaking the extensive effort of recoding and recompiling application specific software code. The common procedure to update rules used by a rule server requires the rule server to be taken offline, rendering the rule server unavailable to end-users. While the rule server is off-line, administrators effect any necessary changes to the online rulesets and thereafter performs a restart operation for the rule server. End-users regain access to the rule server after it returns to an online state. The clear drawback to this approach is that the rule-server becomes unavailable during the rules upgrade operation. With the widespread use and growing dependence upon computers in almost every facet of the business environment, it is often undesirable to take a computer system offline for even a short period of time. Time lost when the computer system is inaccessible could result in lost opportunity and increased frustration to those that depend upon the computer system.

Therefore, it is desirable to implement a method and mechanism for upgrading one or more sets of rules without taking a rule server offline. The present invention provides an improved mechanism for updating rules accessed by a rule server. In an embodiment, the present invention provides a mechanism for connecting one or more rule service agents to a rule server, changing the rules within a rule server, and effecting the new rules without restarting the rule server. Note that the principles disclosed herein are equally applicable to perform update operations for other types of computer systems. Further details of aspects, objects, and advantages of the invention are described below in the detailed description, drawings, and claims.

BRIEF DESCRIPTION OF THE DRAWINGS

The present invention is illustrated by way of example, and not by limitation, in the figures of the accompanying drawings and which like reference numerals refer to similar elements and in which.

DETAILED DESCRIPTION OF EMBODIMENT(S)

Figure 6:
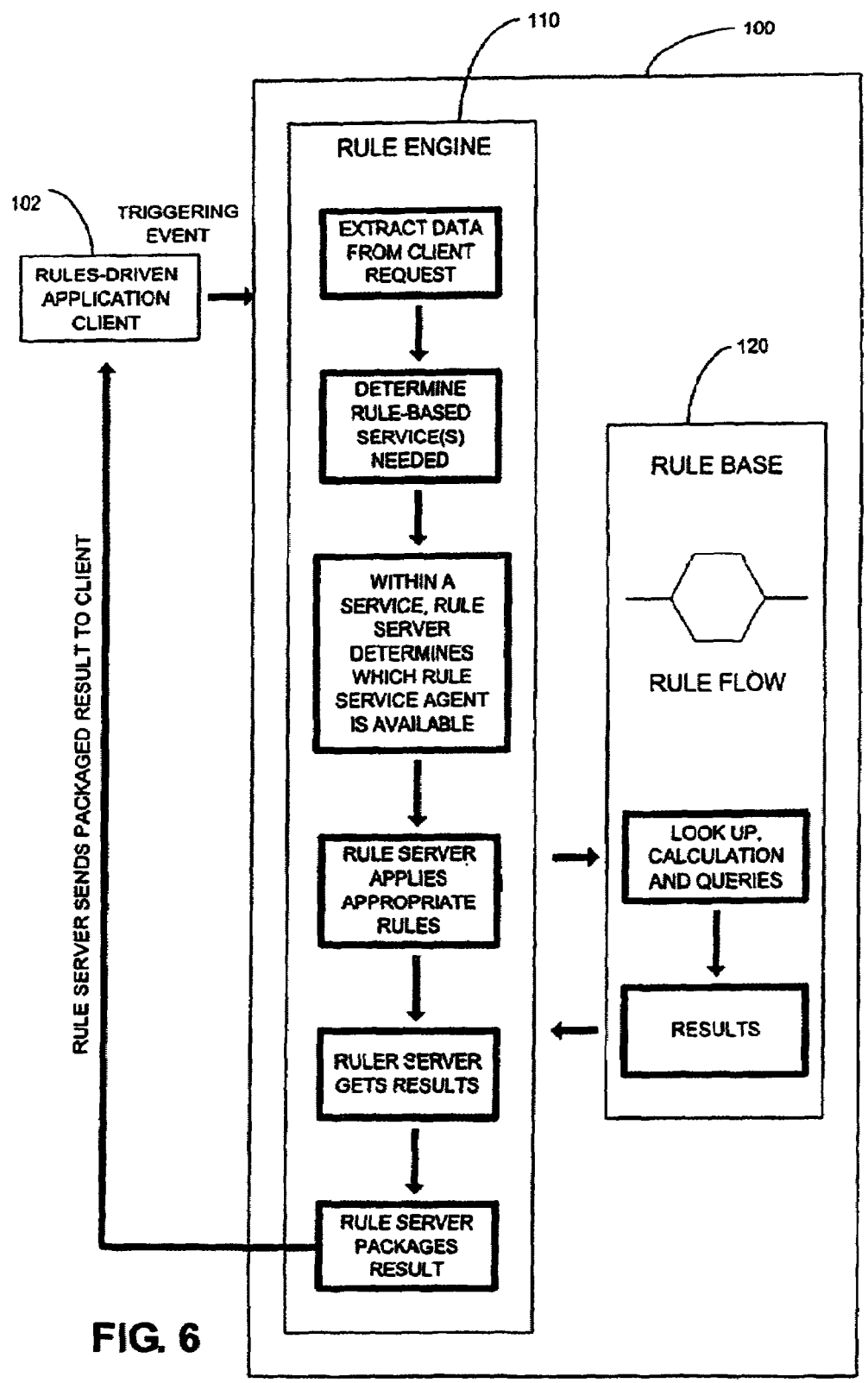
FIG. 6 is a diagram showing an example of a rules-based architecture.

The present invention provides an improved method and mechanism for changing rules in a rules-based computing system and for effecting the new or revised rules without restarting a rule server. FIG. 6 shows an example of an architecture that can be employed for a rules-based system. In the system shown in FIG. 6, a client 102 of a computer-based application connects to a rule server 100 to perform a rules-driven operation. The client 102 may be either a local client or a remote client that connects via a network connection. The rule server 100 comprises or connects to a rulebase 120 that contains one or more rulesets. A rule engine 110 is the mechanism that applies a selected ruleset to input received from client 102 to generate a set of results.

The rule server 100 includes processing entities to perform work on behalf of clients 102. Various types of processing entities are usable in the invention, such as processes, threads, or agents. Such processing entities are referred to herein as rule service agents. The rule server 100 can be configured to provide a pool of rule service agents to handle service requests on behalf of clients 102. Multiple rule service agents are available to handle service requests in parallel from multiple clients 102. Even with only a single rule service agent available, concurrent client requests can be handled using a queuing arrangement for client requests. In an embodiment, a single dedicated rule service agent performs service requests on behalf of a single client. In an alternate embodiment, a single rule service agent can process service requests on behalf on multiple clients.

The present invention permits updates of rules without requiring shutdown of the rule server. In effect, the present invention provides a mechanism for dynamically creating a new version of a rulebase while the rule server is still concurrently engaged in transactions with clients using the old rulebase. This aspect of the invention will be explained with particular reference to FIGS. 1–4, which is illustrated with reference to four phases. For ease of explanation, the operation of the invention is presented as comprising four phases, however, this is merely illustrative and it should be understood that the functional operations performed by the invention may be divided in any number of phases.

Figure 1:
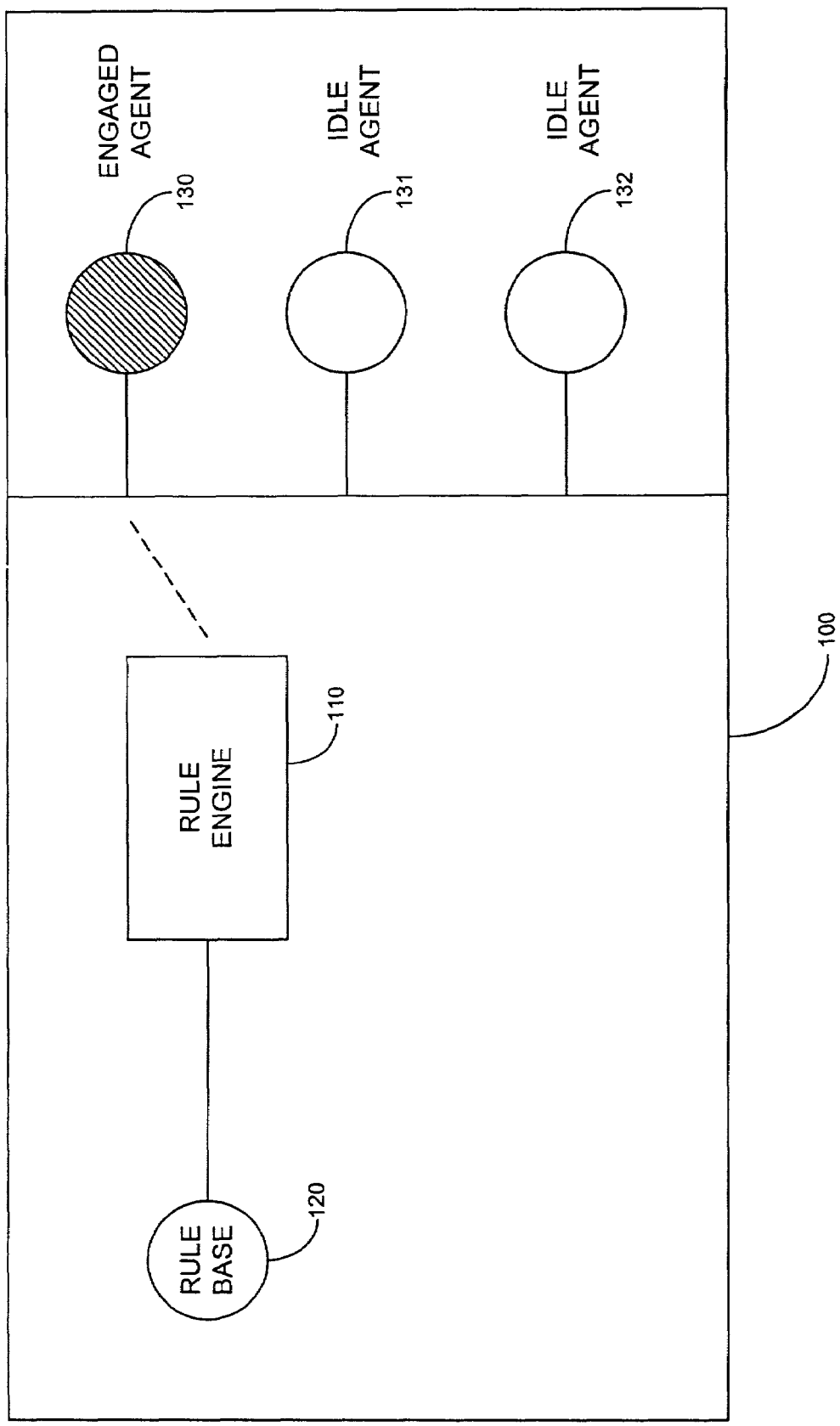
FIG. 1 is a functional block diagram showing a first phase of a rule server according to one embodiment of the present invention.

FIG. 1 is a diagram that illustrates a rule server 100 according to an embodiment of the present invention. Rule server 100 comprises a rule engine 110 and a rulebase 120. As shown in FIG. 1, rule server 100 comprises an engaged rule service agent 130 as well as two idle rule service agents 131 and 132. An engaged rule service agent is an agent that is presently handling a service request on behalf of an application client. Agent 130 is shown interfacing with rule engine 110, which accesses rules in rulebase 120 to perform a requested operation. Thus, rule service agent 130 has already begun its processing using the version of the rules as presently existing in rulebase 120. For the ease of explanation, only three rule service agents are shown; however, it should be understood that any number of engaged or idle rule service agents might be connected to rule server 100.

Consider if it is desired to update the rules in rulebase 120. As noted above, a rule service agent 130 is presently engaged using the rules in rulebase 120. Thus, rule service agent 130 may have already developed processing dependencies based upon the existing version of the rules in rulebase 120. Modifying the existing rules in midstream while rule service agent 130 is still engaged could result in processing errors or faulty results.

One approach to address the rules update operation is to simply permit engaged rule service agent 130 to complete its processing before updating the rules. Under this approach, all new service requests are suspended such that idle rule service agents 131 and 132 do not become engaged using the existing version of the rules in rulebase 120. When engaged rule service agent 130 completes its processing, the rulebase 120 is updated with a new version of the rules. The suspended service requests are thereafter released for processing by idle rule service agents that become engaged using the new version of the rules. The drawback to this approach is that there is a delay in processing for the suspended service requests, and the delay could be significant depending upon the amount of wait time that is needed before all engaged rule service agents 130 completes their processing.

Figure 2:
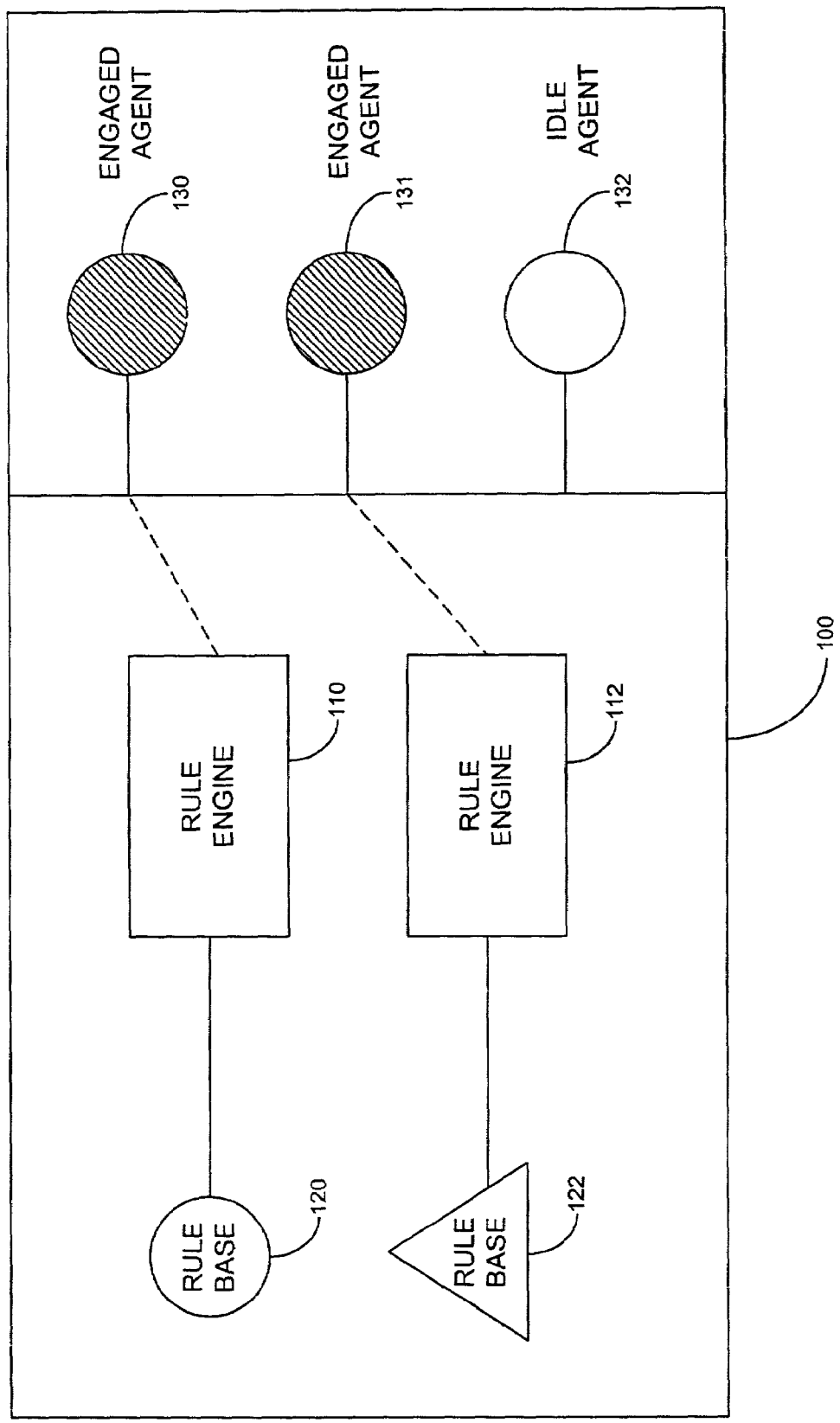
FIGS. 2–4 are diagrams showing additional phases of a rule server according to one embodiment of the present invention.

In the preferred approach, rules update operations are performed without requiring a wait period for engaged rules service agents to finish processing. FIG. 2 shows the next processing phase of the preferred approach for updating rules. Once rule server 100 receives a request to change, delete, or add one or more rules contained within rulebase 120, information within the request is used to identify a new set of rules. In an embodiment of the invention, information within the request only identifies the "delta", or the set of changes to be performed upon the set of rules in rulebase 120. The new set of rules is found by effecting the delta upon the set of rules contained in rulebase 120. In other embodiments of the invention, information within the request identifies the new set of rules without reference to the rules contained within rulebase 120. After the new set of rules is identified, a new rulebase 122 is created within rule server 100 containing the new set of rules. Subsequently, a new rule engine 112 is initiated within rule server 100, which is connected to rulebase 122. According to an embodiment of the invention, a failure to initiate a new rule engine 112 is handled by the rule server 100, which may take action to correct the failure or notify an end-user of the failure.

In this approach, the engaged rule service agent 130 is permitted to continue its processing using existing rules in rulebase 120. Thus, there is no interruption to the engaged rule service agent 130. However, the rule server 100 is configured to concurrently include a rulebase 122 comprising the newly updated rules. All new service requests result in idle rule service agents becoming engaged using the new version of the rules in rulebase 122. For example, FIG. 2 shows engaged rule service agent 131 processing a service request using new rules in rulebase 122 via another instance of rule engine 112.

In effect, all existing service requests already begin handled before the rules update will continue to be processed using the old version of the rules. All new service requests being handled after the rules update will be processed using the new version of the rules. Service requests received during the time the rules are being updated in the rulebase 120 may be handled in various manners by embodiments of the invention. According to one embodiment, received service requests are queued until the new rulebase 122 is accessible. Once the new rulebase 122 is accessible, all new service requests and all queued service requests will be processed by the new rulebase 122. This approach is advantageous because it (a) guarantees that a new service request will be processed by the new rulebase 122, (b) to the extent that queuing is necessary, the delay time is minimal. In another embodiment, received service requests continue to be serviced by the existing rulebase 120 until the new rulebase 122 becomes accessible. In this approach, the rules update operation does not wait for all engaged rule service agents to complete their processing. Instead, the rules update operation can begin immediately without affecting any existing processing occurring against the existing rulebase 120 by creating the new rulebase 122, from which new service requests will be processed once it is accessible. In other words, only after the new rulebase 122 is created and accessible are service requests routed to a new rulebase. This embodiment is advantageous because it allows new service requests to be handled by the new rulebase 122 once it is available without performance degradation, since service requests are not queued.

New service requests may be directed to the appropriate rule engine for servicing by a variety of means. In an embodiment of the invention, rule server 100 maintains one or more request queues corresponding to work requests from rule service agents. Identifiers for rule engines are associated with work requests that are routed to a particular rule engine. When a new rule engine corresponding to a new rulebase is initiated, rule server 100 routes all further work requests in the request queue(s) to the new rule engine.

Figure 9:
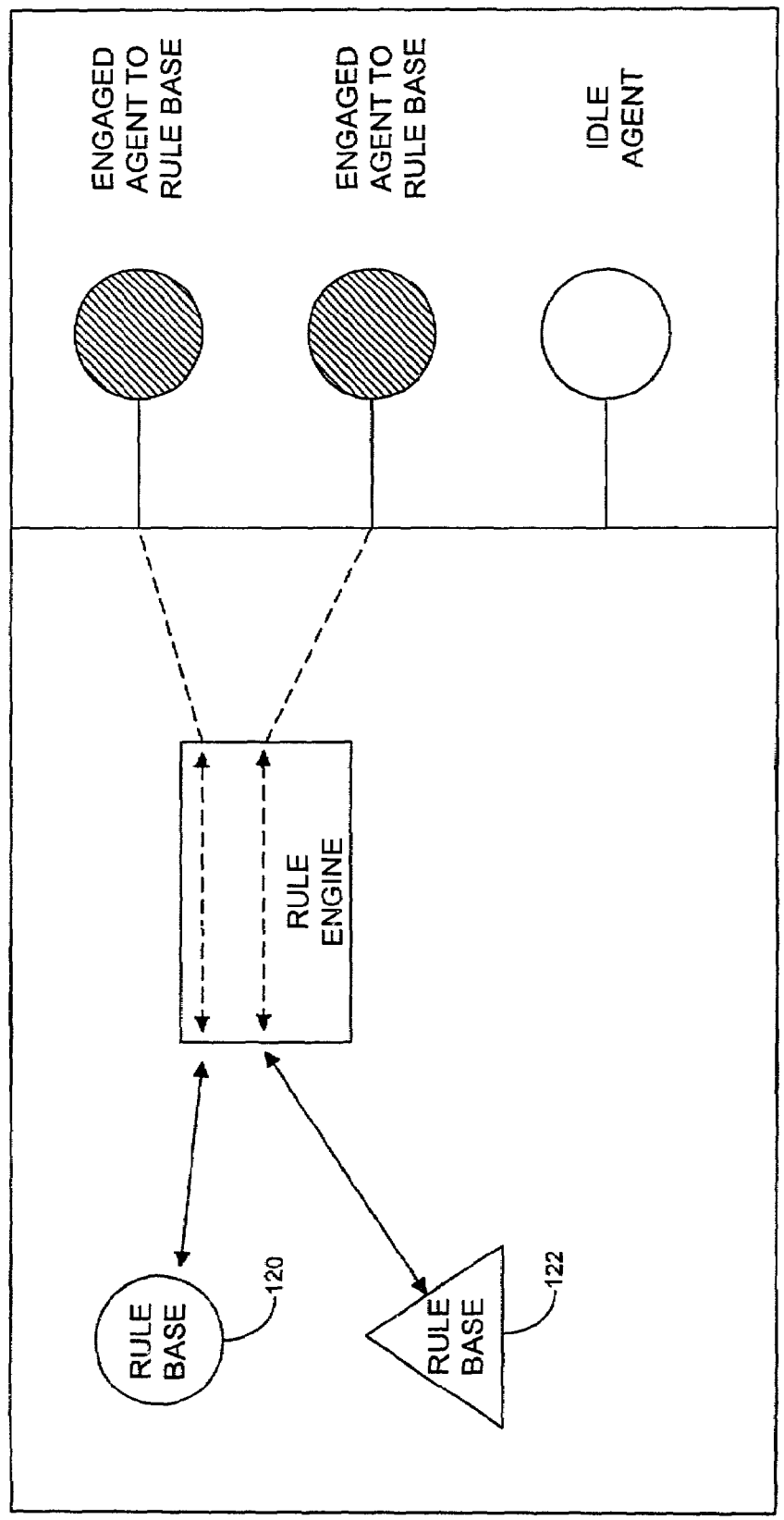
FIG. 9 is a diagram of a rule server phase according to an alternate embodiment of the invention.

In an alternative embodiment, a new instance of the rule engine 112 is not created for each new rulebase 122. Instead, the existing rule engine 110 is configured to access multiple rulebases. All engage rule service agents access the old rulebase 120 via rule engine 110. In addition, all new service requests after installation of a new rulebase 122 are also handled via rule engine 110. The rule engine 110 is configured to recognize which version of the rulebase is appropriate for each engaged rule service agent. This aspect of the invention is shown in FIG. 9.

Figure 3:
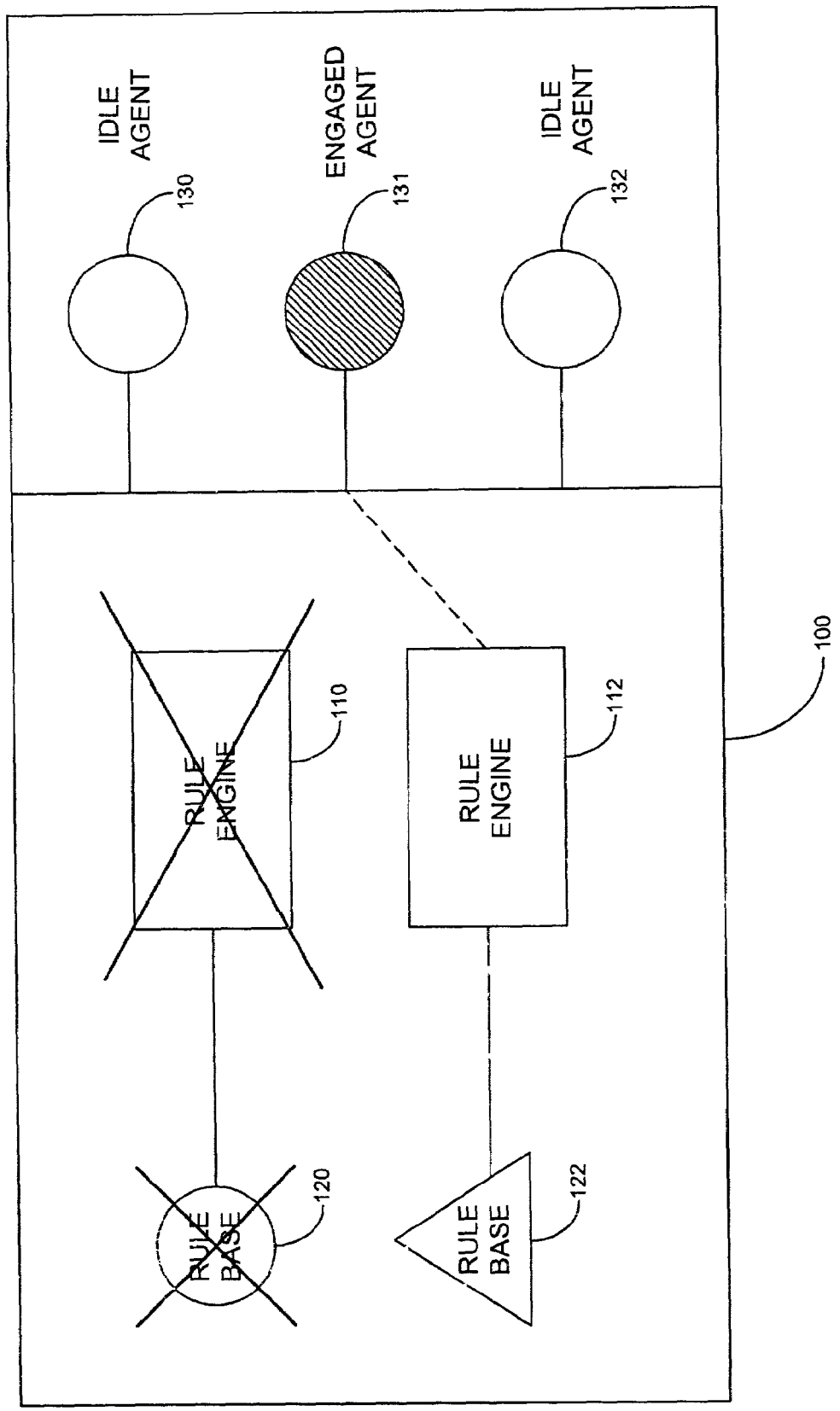

FIG. 3 is a diagram that illustrates a subsequent phase of the present invention, after all engaged rule service agents operating with the old version of the rules have completed their processing. In particular, rule service agent 130, which was accessing the old version of the rules in rulebase 120, has completed its work on behalf of an application client and is now idle. As noted above, all new service requests are routed to the new rules in rulebase 122 via new rule engine 112. Thus, once the existing rule service agents have completed their processing against the old rulebase 120, there should no longer be any further agents, particularly newly engaged agents, operating against old rulebase 120. This is represented in FIG. 3 in which no rule service agents are shown connected to rulebase 120 through rule engine 110.

Rule server 100 monitors the number of rule service agents being serviced by rule engine 110 through means, such as, for example, maintaining a counter for each rule engine indicating the number of rule service agents currently being serviced with by the rule engine. When rule engine 110 is no longer servicing any rule service agents, rule engine 110 and rulebase 120 are both removed from rule server 100, and rule server 100 then enters the next phase of the invention.

Figure 4:
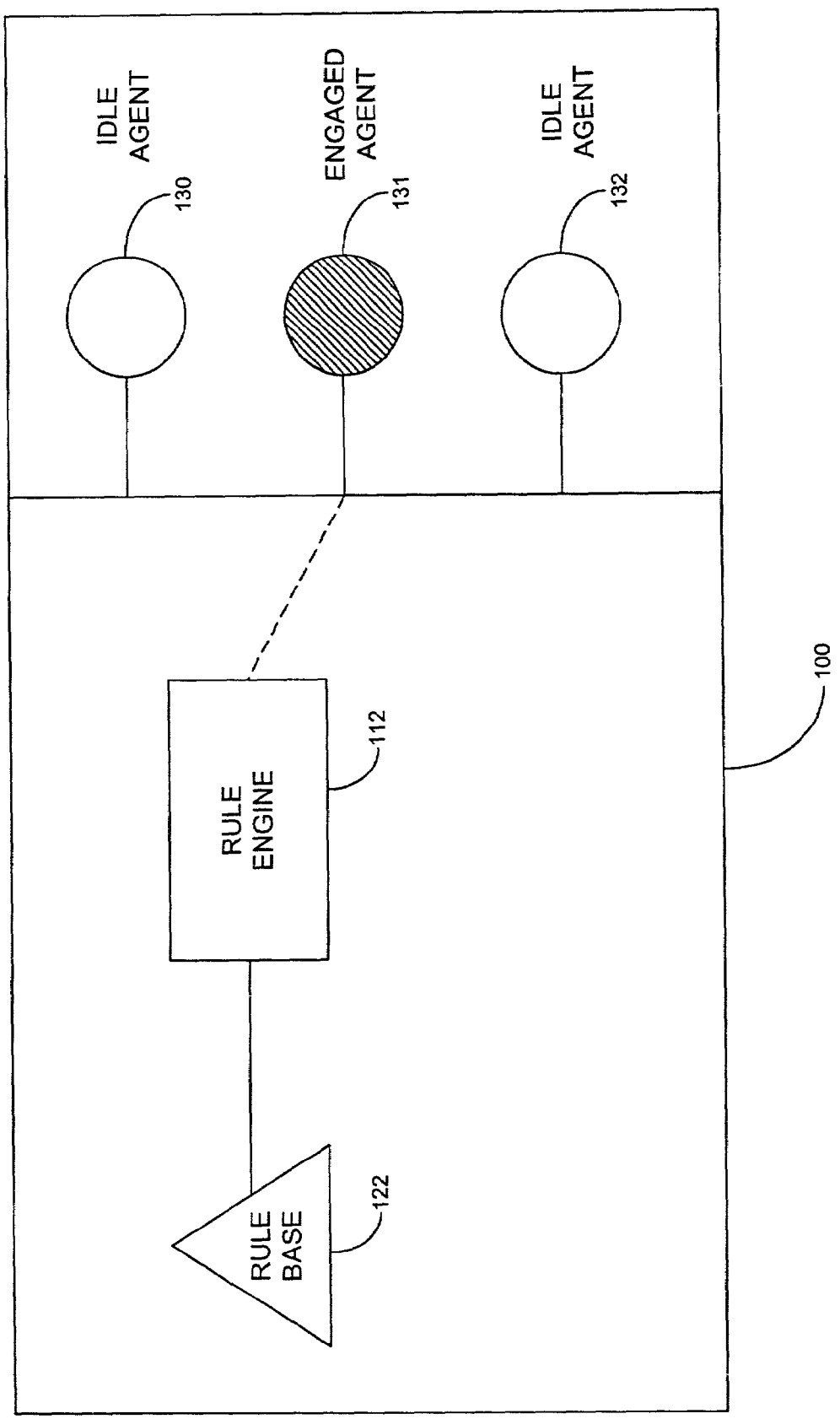

FIG. 4 is a diagram that illustrates the next phase of the invention. The rule server has now returned to its original state of a single rule engine connected to a single rulebase, except, however, the single rulebase 122 comprises the newly updated set of rules. The rules update operation occurred without taking the rule server 100 offline and with either a minimal or no interruption in service for new service requests. The phases of the invention discussed above may be repeated as often as desired to effect rule changes to a rule server.

Figure 5:
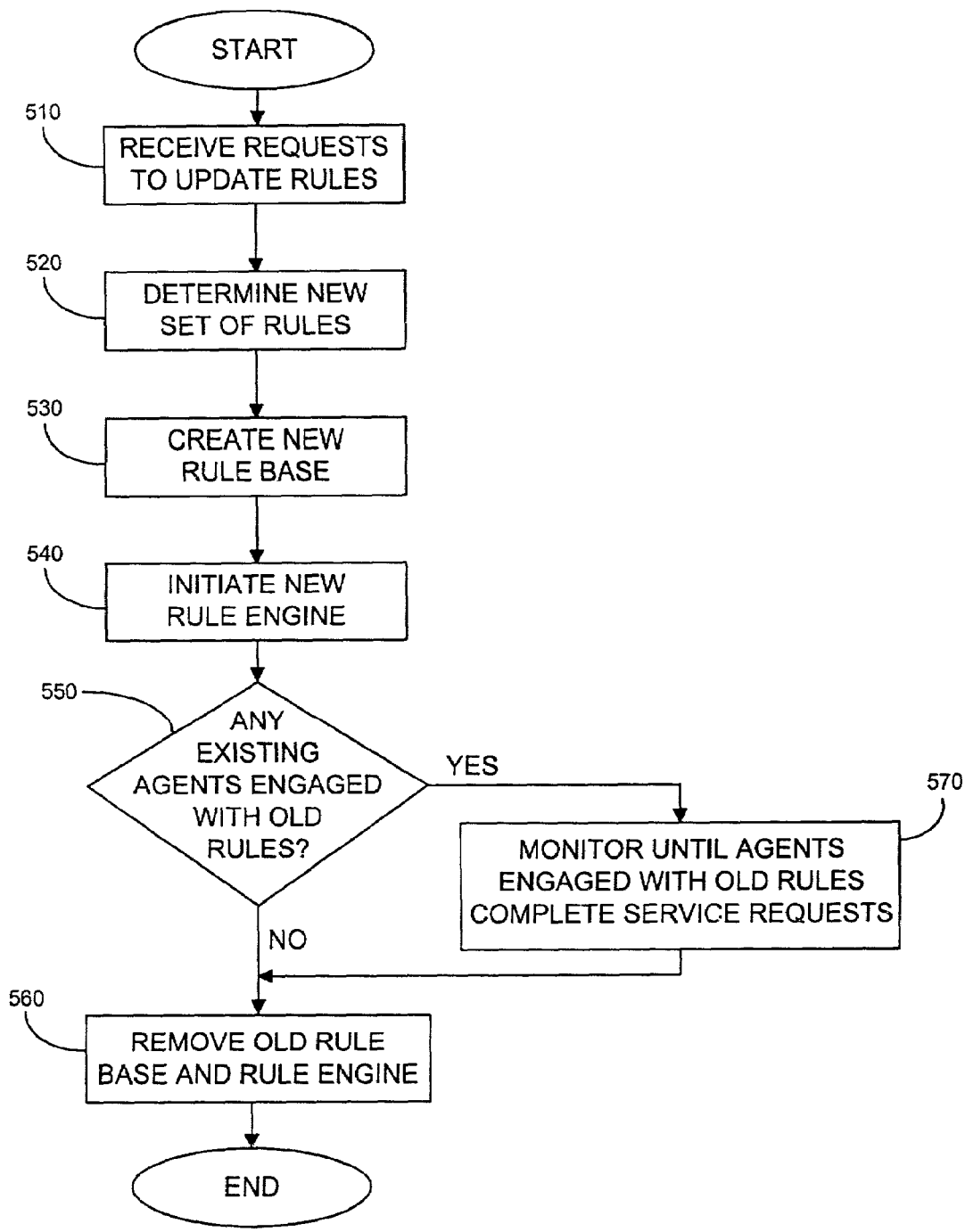
FIG. 5 is a process flow chart according to one embodiment of the present invention.

The process flow of rule server 100 according to one embodiment of the present invention will now be described with reference to FIG. 5. Rule server 100 receives (510) a request to update the rules contained therein. In one embodiment, the request identifies a new set of rules to be used in place of the current set used by rule server 100. In another embodiment, the request identifies a delta, i.e., a set of changes to effect upon the current set of rules used by rule server 100. The request to update the rules contained therein (510) may be received by the rule server 100 through an API on request of an end-user or an application, such as, e.g., an administrative application or workflow application. In an alternate embodiment, the request to update the rules contained therein (510) may be received through a perceived change by monitoring an existing rulebase 120. In such an embodiment, a monitor (not shown) may reside in the rule server 100 to monitor changes in an existing rulebase 120, and notify the rule server 100 when those changes are made. The monitor may periodically check the existing rulebase 120 for such modifications.

After the request to update rules in received, rule server 100 determines (520) the new set of rules to be used by rule server 100. In one embodiment, the new set of rules is identified in the request of step 510. In another embodiment, the new set of rules is identified by applying a delta contained within the request of step 510 to the current set of rules used by rule server 100.

Rule server 100 creates (530) a new rulebase, distinct from the preexistent rulebase, that contains the new set of rules identified in step 520. Subsequently, rule server 100 initiates (540) a new rule engine, distinct from the preexistent rule engine, that is operatively connected to the new rulebase created in step 530. Rule server 100 contains a mechanism such that all rule service agents that connect to rule server 100 subsequent to the creation of the new rule engine in step 540 connect to the new rule engine.

Next, rule server 100 determines if the preexistent rule engine is servicing any rule service agents (550). Rule server 100 contains a mechanism to monitor how many rule service agents each rule engine is servicing. In one embodiment, a counter associated with a particular rule engine is incremented each time that the particular rule engine services a new rule service agent, and is decremented each time that the particular rule engine stops servicing a rule service agent. Rule server 100 determines how many rule service agents the preexistent rule engine is servicing by consulting the associated counter.

If the preexistent rule engine is not servicing any rule service agents, then rule server 100 removes the preexistent rule engine and the preexistent rulebase (560). Subsequently, rule server 100 returns to an operational steady state (580); henceforth the process may be repeated to accommodate a new update to the rules of rule server 100. If the preexistent rule engine is servicing rule service agents, then rule server 100 monitors the preexistent rule engine until it is no longer servicing any rule service agents (570); after the preexistent rule engine is not servicing any rule service agents, rule server 100 proceeds to step 560.

System Architecture Overview

Figure 7:
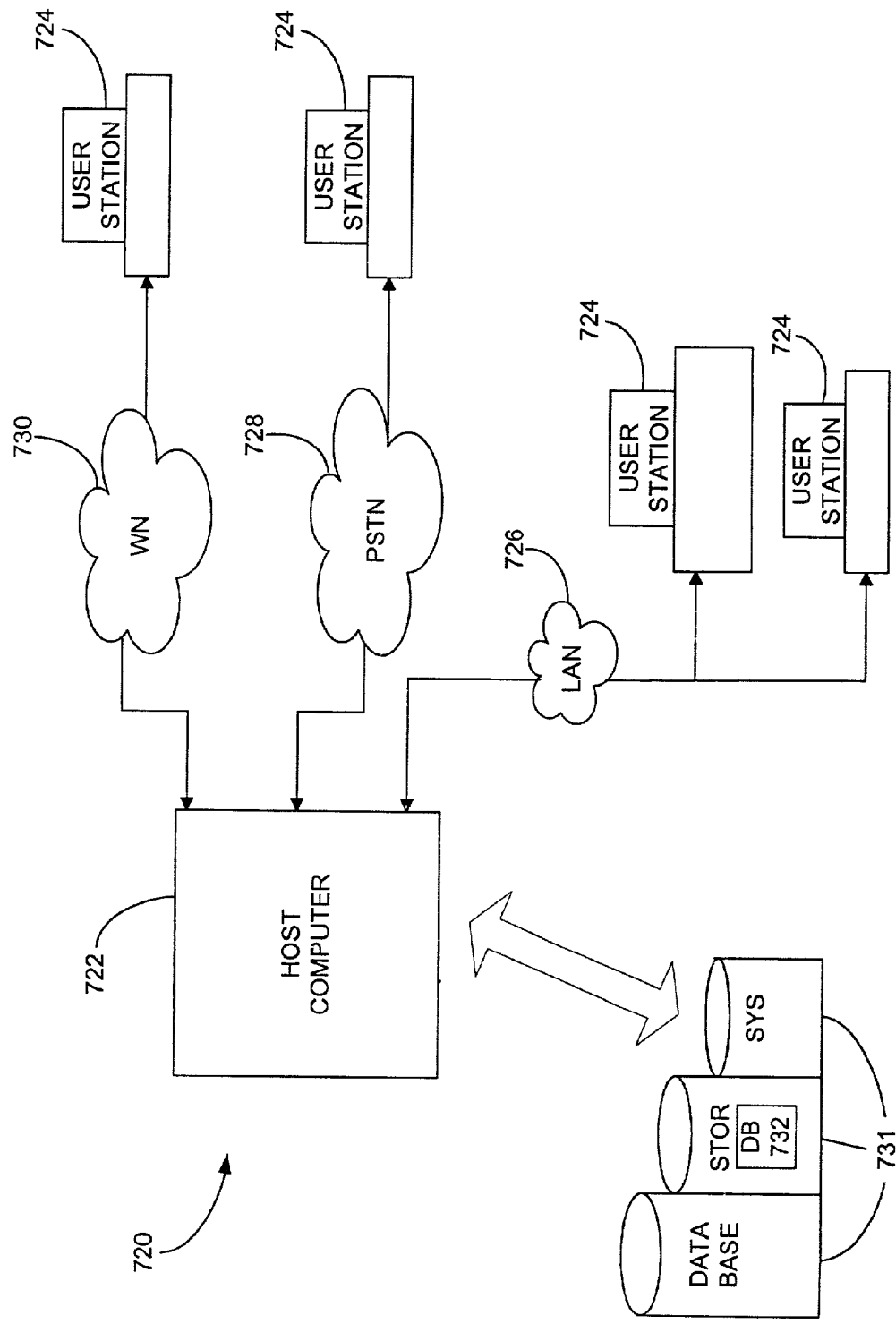
FIG. 7 is a diagram of a system architecture with which the present invention can be implemented.

Referring to FIG. 7, in an embodiment, a computer system 720 includes a host computer 722 connected to a plurality of individual user stations 724. In an embodiment, the user stations 724 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 724 are connected to the host computer 722 via a local area network ("LAN") 726. Other user stations 724 are remotely connected to the host computer 722 via a public telephone switched network ("PSTN") 728 and/or a wireless network 730.

In an embodiment, the host computer 722 operates in conjunction with a data storage system 731, wherein the data storage system 731 contains a database 732 that is readily accessible by the host computer 722. Note that a multiple tier architecture can be employed to connect user stations 724 to a database 732, utilizing for example, a middle application tier (not shown). In alternative embodiments, the database 732 may be resident on the host computer, stored, e.g., in the host computer's ROM, PROM, EPROM, or any other memory chip, and/or its hard disk. In yet alternative embodiments, the database 732 may be read by the host computer 722 from one or more floppy disks, flexible disks, magnetic tapes, any other magnetic medium, CD-ROMs, any other optical medium, punchcards, papertape, or any other physical medium with patterns of holes, or any other medium from which a computer can read. In an alternative embodiment, the host computer 722 can access two or more databases 732, stored in a variety of mediums, as previously discussed.

Figure 8:
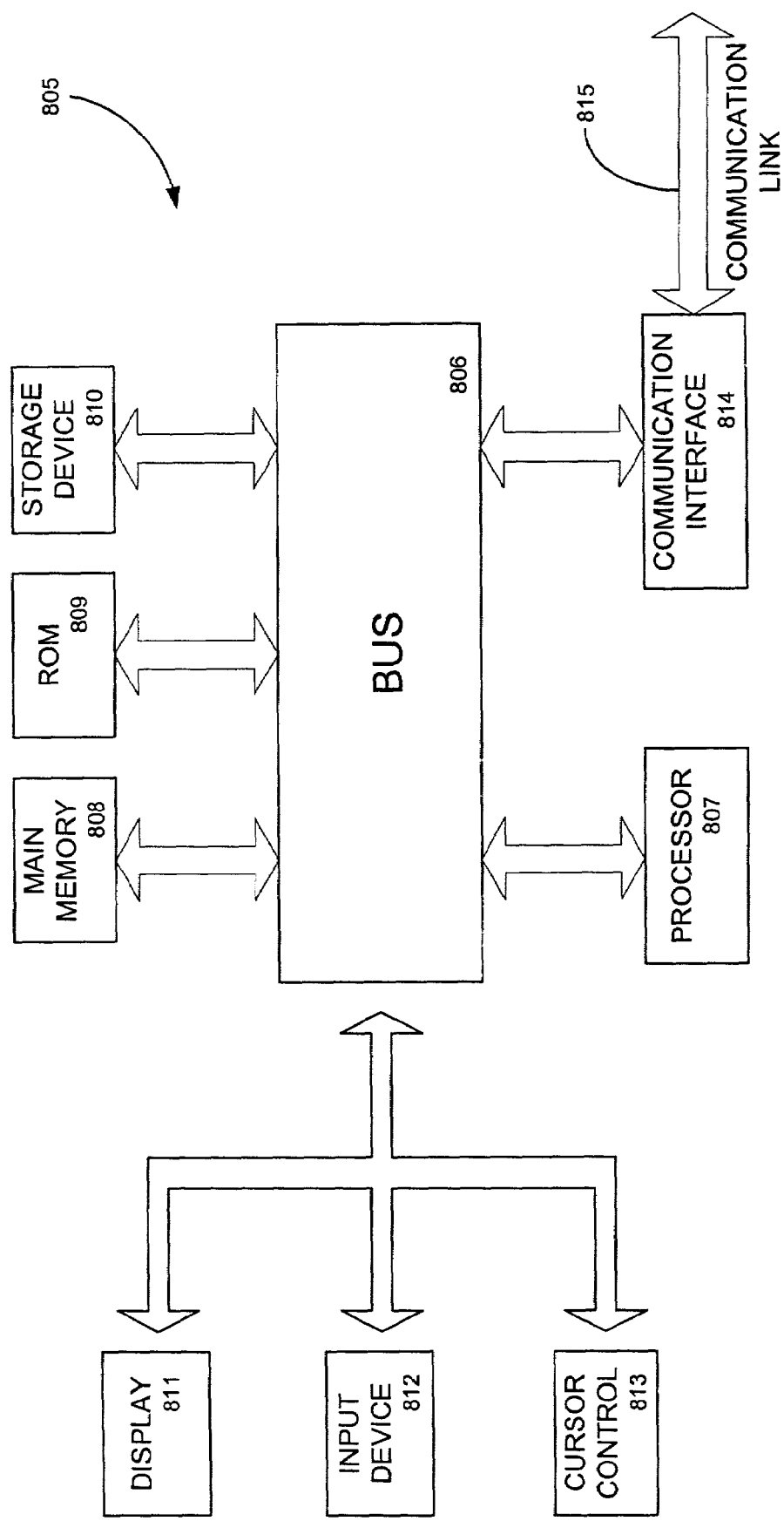
FIG. 8 is an additional diagram of a system architecture with which the present invention may be implemented.

Referring to FIG. 8, in an embodiment, each user station 724 and the host computer 722, each referred to generally as a processing unit, embodies a general architecture 805. A processing unit includes a bus 806 or other communication mechanism for communicating instructions, messages and data, collectively, information, and one or more processors 807 coupled with the bus 806 for processing information. A processing unit also includes a main memory 808, such as a random access memory (RAM) or other dynamic storage device, coupled to the bus 806 for storing dynamic data and instructions to be executed by the processor(s) 807. The main memory 808 also may be used for storing temporary data, i.e., variables, or other intermediate information during execution of instructions by the processor(s) 807. A processing unit may further include a read only memory (ROM) 809 or other static storage device coupled to the bus 806 for storing static data and instructions for the processor(s) 807. A storage device 810, such as a magnetic disk or optical disk, may also be provided and coupled to the bus 806 for storing data and instructions for the processor(s) 807.

A processing unit may be coupled via the bus 806 to a display device 811, such as, but not limited to, a cathode ray tube (CRT), for displaying information to a end-user. An input device 812, including alphanumeric and other columns, is coupled to the bus 806 for communicating information and command selections to the processor(s) 807. Another type of user input device may include a cursor control 813, such as, but not limited to, a mouse, a trackball, a fingerpad, or cursor direction columns, for communicating direction information and command selections to the processor(s) 807 and for controlling cursor movement on the display 811.

According to one embodiment of the invention, the individual processing units perform specific operations by their respective processor(s) 807 executing one or more sequences of one or more instructions contained in the main memory 808. Such instructions may be read into the main memory 808 from another computer-usable medium, such as the ROM 809 or the storage device 810. Execution of the sequences of instructions contained in the main memory 808 causes the processor(s) 807 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 807. Such a medium may take many forms, including, but not limited to, non-volatile, volatile and transmission media. Non-volatile media, i.e., media that can retain information in the absence of power, includes the ROM 809. Volatile media, i.e., media that can not retain information in the absence of power, includes the main memory 808. Transmission media includes coaxial cables, copper wire and fiber optics, including the wires that comprise the bus 806. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 807 can retrieve information. Various forms of computer-usable media may be involved in providing one or more sequences of one or more instructions to the processor(s) 807 for execution. The instructions received by the main memory 808 may optionally be stored on the storage device 810, either before or after their execution by the processor(s) 807.

Each processing unit may also include a communication interface 814 coupled to the bus 806. The communication interface 814 provides two-way communication between the respective user stations 824 and the host computer 822. The communication interface 814 of a respective processing unit transmits and receives electrical, electromagnetic or optical signals that include data streams representing various types of information, including instructions, messages and data. A communication link 815 links a respective user station 824 and a host computer 822. The communication link 815 may be a LAN 726, in which case the communication interface 814 may be a LAN card. Alternatively, the communication link 815 may be a PSTN 728, in which case the communication interface 814 may be an integrated services digital network (ISDN) card or a modem. Also, as a further alternative, the communication link 815 may be a wireless network 730. A processing unit may transmit and receive messages, data, and instructions, including program, i.e., application, code, through its respective communication link 815 and communication interface 814. Received program code may be executed by the respective processor(s) 807 as it is received, and/or stored in the storage device 810, or other associated non-volatile media, for later execution. In this manner, a processing unit may receive messages, data and/or program code in the form of a carrier wave.

In the foregoing specification, the invention has been described with reference to specific embodiments thereof. It Will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

I claim:

1. A method for updating rules at a rule server, said rule server comprising a first rule engine connected to a first rulebase and one or more agents to handle service requests on behalf of clients, the method comprising:

said rule server receiving a request to update rules in said first rulebase by any of: changing, deleting, and adding to one or more rules contained in said first rulebase, wherein said request comprises information usable to identify a new set of rules;

responsive to said rule server receiving a said request to update rules in said first rulebase, creating a second rulebase comprising said new set of rules at said rule server, said second rulebase concurrently existing with said first rulebase;

servicing new service requests with said second rulebase; and removing said first rulebase when no further service requests from said one or more agents are being serviced by said first rulebase.

2. The method of claim 1, wherein second rulebase is comprised of a different set of rules than said first rulebase.

3. The method of claim 1 further comprising:

initiating a second rule engine at said rule server.

4. The method of claim 3, wherein said step of servicing new service requests with said second rule engine further comprises:

said rule server determining a particular rule engine to service said service requests.

5. The method of claim 3 further comprising:

removing said first rule engine when said first rule engine is no longer servicing work requests from said one or more agents.

6. The method of claim 1, wherein said rule server is not taken offline and restarted.

7. The method of claim 1, wherein at least one of said first rule engine and said second rule engine is designed using a programming language that can operate on different machine platforms.

8. A computer-readable medium having thereon instructions for performing a process for updating rules at a rule server, said rule server comprising a first rule engine connected to a first rulebase and one or more agents to handle service requests on behalf of clients, said process comprising:

said rule server receiving a request to update rules in said first rulebase by any of: changing, deleting, and adding to one or more rules contained in said first rulebase, wherein said request comprises information usable to identify a new set of rules;

responsive to said rule server receiving said request to update rules in said first rulebase, creating a second rulebase comprising said new set of rules at said rule server, said second rulebase concurrently existing with said first rulebase;

servicing new service requests with said second; and removing said first rulebase when no further service requests from said one or more agents are being serviced by said first rulebase.

9. The computer-readable medium of claim 8, wherein second rulebase is comprised of a different set of rules than said first rulebase.

10. The computer-readable medium of claim 8 further comprising:

initiating a second rule engine at said rule server.

11. The computer-readable medium of claim 10, wherein said step of servicing new service requests with said second rule engine further comprises:

said rule server determining a particular rule engine to service said service requests.

12. The computer-readable medium of claim 10 further comprising:

removing said first rule engine when said first rule engine is no longer servicing work requests from said one or more agents.

13. The computer-readable medium of claim 8, wherein said rule server is not taken offline and restarted.

14. The computer-readable medium of claim 8, wherein at least one of said first rule engine and said second rule engine is designed using a programming language that can operate on different machine platforms.

* * * * *